United States Patent [19]

Murata et al.

[11] Patent Number: 5,377,326
[45] Date of Patent: Dec. 27, 1994

[54] ELECTRONIC APPARATUS WITH REMOTE DATA SUPPLEMENTATION/UPDATE SELECTION AND ERROR DISPLAY

[75] Inventors: Kaoru Murata, Nara; Eichika Matsuda, Yamatotakada, both of Japan

[73] Assignee: Sharp Kabushiki Kaisha, Japan

[21] Appl. No.: 80,052

[22] Filed: Jun. 22, 1993

Related U.S. Application Data

[63] Continuation of Ser. No. 548,301, Jul. 5, 1990, abandoned.

[30] Foreign Application Priority Data

Jul. 6, 1989 [JP] Japan ................................. 1-174983
Jul. 6, 1989 [JP] Japan ................................. 1-174984

[51] Int. Cl.$^5$ ........................................ G06F 3/00
[52] U.S. Cl. ........................ 395/200; 364/709.04;
364/709.14; 364/710.08; 364/222.81;
364/222.82; 364/238.4; 364/DIG. 1; 395/600
[58] Field of Search ............ 395/800, 575, 200, 600,
395/425; 364/705.05, 705.06, 709.09, 709.14,
709.15, 710.04, 710.08

[56] References Cited

U.S. PATENT DOCUMENTS

| | | | |
|---|---|---|---|
| 4,117,542 | 9/1978 | Klausner et al. | 364/705.04 |
| 4,737,911 | 4/1988 | Freeman, Jr. | 364/406 |
| 4,814,892 | 3/1989 | Igarashi | 356/296 |
| 4,833,632 | 5/1989 | Nishimura et al. | 364/709.04 |
| 4,847,760 | 7/1989 | Yagi | 364/400 |
| 4,961,158 | 10/1990 | Sussman | 364/709.04 |
| 5,017,766 | 5/1991 | Tanada et al. | 235/492 |
| 5,025,444 | 6/1991 | Clayton et al. | 371/34 |
| 5,153,906 | 10/1992 | Akiyama | 379/112 |

*Primary Examiner*—Alyssa H. Bowler
*Assistant Examiner*—Alpesh M. Shah
*Attorney, Agent, or Firm*—Nixon & Vanderhye

[57] ABSTRACT

A small electronic apparatus such as an electronic organizer, electronic memo, etc. is disclosed which has a memory for storing data, and a communication unit for transmitting data stored in the memory to another electronic apparatus, and for receiving data from the other electronic apparatus. The apparatus selects, before transmitting at least one portion of said data, either of an add mode (transmitted data is added to data stored in the other electronic apparatus) and a update mode (data stored in the other electronic apparatus is replaced with the transmitted data). The apparatus has a signal unit for, when the add mode is selected, transmitting a first signal indicative that the add mode is selected to the other electronic apparatus, and for, when the update mode is selected, transmitting a second signal indicative that the update mode is selected to the other electronic apparatus. The apparatus displays data which has been transmitted when a data transmission error has occurred.

5 Claims, 16 Drawing Sheets

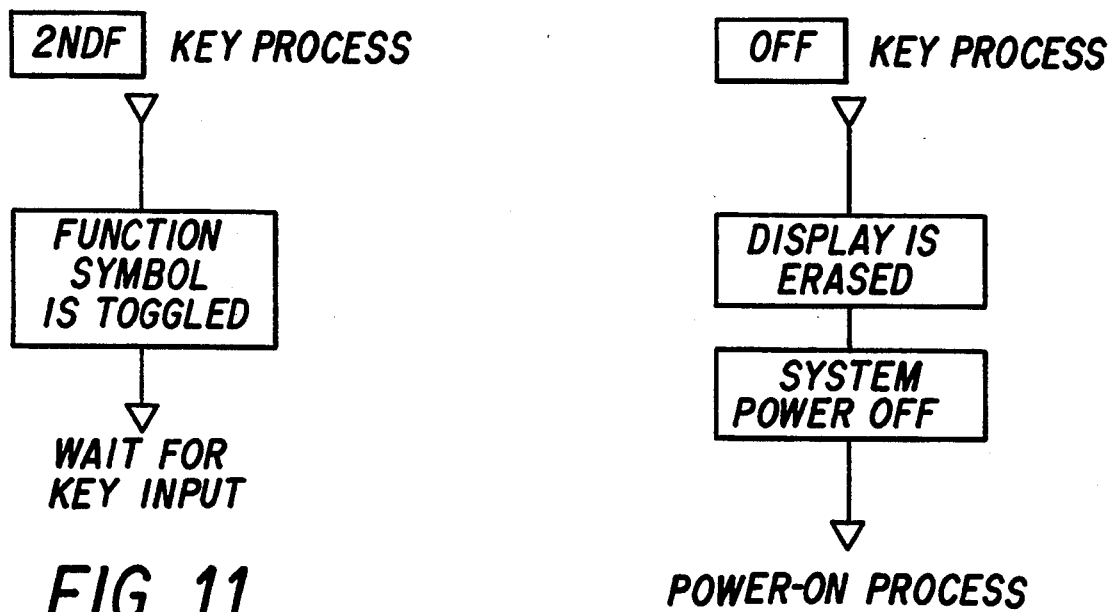
FIG. 11
FIG. 10
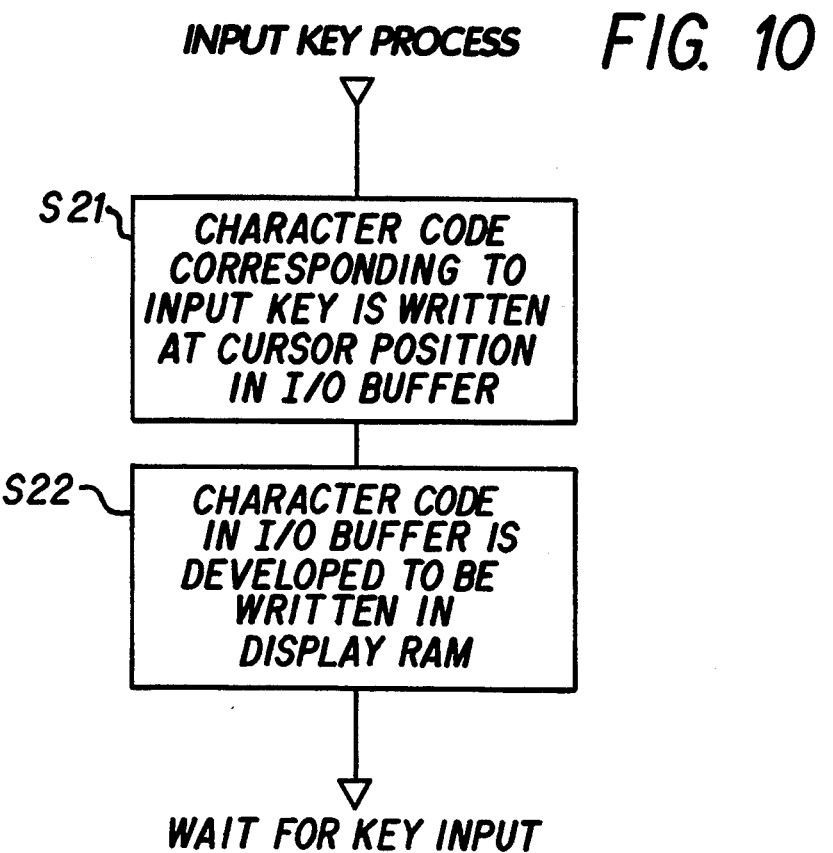
FIG. 12

|  | NAME? | 5 |

FIG. 17A

JONES | JONES_ | 5a

FIG. 17B

[ENTER] | NUMBER?

FIG. 17C 03-123-4567 | JONES | 5a
              | 03-123-4567_ | 5b

FIG. 17D

[ENTER] | (COMPANY NAME? )

FIG. 17E

SHARP | (SHARP_ )

FIG. 17F

[ENTER] | NAME?

FIG. 18E  PARTY

```
|P A R T Y -|   |   |   |   |   |
|1 0|- |1 2| |1 2|:|3 5|   |   |   |
```

FIG. 18F  [ENTER]

TRANSMISSION ERROR ← → NORMAL ERROR (b)
| S | H | A | R | P | | | | | | | | | | | |
| 0 | 7 | 4 | 3 | 5 | - | 3 | - | 5 | 5 | 2 | 1 | | | | |

ELECTRONIC APPARATUS WITH REMOTE DATA SUPPLEMENTATION/UPDATE SELECTION AND ERROR DISPLAY

This is a continuation of application Ser. No. 07/548,301, filed Jul. 5, 1990, now abandoned.

BACKGROUND OF THE INVENTION

1. Field of the Invention

This invention relates to an electronic apparatus, and more particularly to a small electronic apparatus such as a so-called electronic organizer, an electronic memo or data book or the like which can transmit stored data.

2. Description of the Prior Art

Recently, small electronic apparatus which can store various type of information such as telephone numbers and schedule data have been developed. In such an electronic apparatus, data is stored in a memory such as a RAM. Some electronic apparatus have a communication function for transmitting data which is stored in a memory.

In a conventional electronic apparatus having a communication function, data transmission is performed by the following two methods. In the first method, the data stored in the receiving electronic apparatus is erased before beginning communications, and then the data from the transmitting electronic apparatus is stored in a memory of the receiving apparatus. In the second method, the data transmitted from the transmitting apparatus is stored in the memory of the receiving apparatus in such a manner that the transmitted data is added to the data which has been already stored in the memory of the receiving apparatus before beginning communications.

In an electronic apparatus of the prior art, one of these methods is used depending on the type of electronic apparatus. Therefore, in communication between two electronic apparatus employing the first method, data cannot be transmitted without erasing the data already stored in the receiving apparatus. In communication between two electronic apparatus employing the second method, by contrast, data cannot be transmitted when the amount of data to be transmitted is too large or when there is not enough free memory space in the receiving apparatus. Due to these problems, it is often difficult to transmit data between electronic apparatus of the prior art.

In such data transmission, a transmission error may occur because of various reasons, thereby interrupting the data transmission in the midway. One of the causes of such a transmission error is the insufficient capacity of the memory in the receiving electronic apparatus. When a transmission error occurs, a message is shown on a display device to indicate that a transmission error has occurred is shown on the display of the electronic apparatus.

When an error occurs during the process of transmitting data, the user can confirm transmitted data, by displaying data which has been transmitted on a display device. However, this confirmation must be performed by calling data which has been transmitted from a memory and displaying it one by one, with the result that it is not easy in an electronic apparatus of the prior art to confirm data which has been transmitted before occurring a data transmission error.

SUMMARY OF THE INVENTION

The electronic apparatus of this invention, which overcomes the above-discussed and numerous other disadvantages and deficiencies of the prior art, comprises a memory means for storing data, and a communication means for transmitting at least one portion of said data stored in said memory means to another electronic apparatus, and further comprises a selection means for, before transmitting at least one portion of said data, selecting either of an add mode and a update mode, in said add mode said transmitted portion of data being added to data stored in said other electronic apparatus, in said update mode data stored in said other electronic apparatus being replaced with said transmitted portion of data.

The apparatus may further comprise a signal means for, when said add mode is selected, transmitting a first signal to said other electronic apparatus, said first signal being indicative that said add mode is selected, and for, when said update mode is selected, transmitting a second signal to said other electronic apparatus, said second signal being indicative that said update mode is selected.

The electronic apparatus according to the invention comprises a memory means for storing data, and a communication means for transmitting at least one portion of said data stored in said memory means to another electronic apparatus, and for receiving data from said other electronic apparatus, and further comprises a selection means for, before transmitting at least one portion of said data, selecting either of an add mode and a update mode, in said add mode said transmitted portion of data being added to data stored in said other electronic apparatus, in said update mode data stored in said other electronic apparatus being replaced with said transmitted portion of data.

Alternatively, the apparatus may further comprise a signal means for, when said add mode is selected, transmitting a first signal to said other electronic apparatus, said first signal being indicative that said add mode is selected, and for, when said update mode is selected, transmitting a second signal to said other electronic apparatus, said second signal being indicative that said update mode is selected.

Preferably, the apparatus further comprises a memory management means for, when said communication means receives said first signal from said other electronic apparatus, add data transmitted from said other electronic apparatus to data stored in said memory means, and for, when said communication means receives said second signal from said other electronic apparatus, replacing data stored in said memory means being replaced with data transmitted from said other electronic apparatus.

The electronic apparatus according to the invention comprises: a memory means for storing data; a communication means for transmitting at least one portion of said data stored in said memory means to another electronic apparatus; and a display means, and further comprises an error data display means for, when an error occurs during the data transmission, displaying data which has been under the transmission when said error has occurred, on said display means.

In the apparatus, the error data display means may display the contents of data which has been under the transmission when said error has occurred, on said display means.

The electronic apparatus according to the invention comprises: a memory means for storing data; a communication means for transmitting at least one portion of said data stored in said memory means to another electronic apparatus; and a display means, and further comprises: an error detection means for, when an error occurs during the data transmission, detecting said error; a data storage means for, when said error detection means detects said error, temporarily storing the data which has been under the transmission when said error has occurred; and an error data display means for, when said error detection means detects said error, displaying the contents of said data storage means on said display means.

The electronic apparatus according to the invention comprises: a memory means for storing data; a communication means for transmitting at least one portion of said data stored in said memory means to another electronic apparatus, for receiving data from said other electronic apparatus; and a display means, and further comprises an error data display means for, when an error occurs during the data transmission or data reception, displaying data which has been under the transmission or reception when said error has occurred, on said display means.

The electronic apparatus comprising: a memory means for storing data; a communication means for transmitting at least one portion of said data stored in said memory means to another electronic apparatus, and for receiving data from said other electronic apparatus; and a display means, and further comprises: an error detection means for, when an error occurs during the data transmission or data reception, detecting said error; a data storage means for, when said error detection means detects said error, temporarily storing the data which has been under the transmission or reception when said error has occurred, and an error data display means for, when said error detection means detects said error, displaying the contents of said data storage means on said display means.

Thus, the invention described herein makes possible the objectives:
(1) providing an electronic apparatus which can transmit and/or receive data to and from another electronic apparatus by either of the two methods; and
(2) providing an electronic apparatus in which the user can easily confirm data which has been safely transmitted before the occurrence of a data transmission error.

BRIEF DESCRIPTION OF THE DRAWINGS

This invention may be better understood and its numerous objects and advantages will become apparent to those skilled in the art by reference to the accompanying drawings as follows:

FIG. 10 is a flowchart of the OFF key process.

FIG. 11 is a flowchart of the 2NDF key process.

FIG. 12 is a flowchart of the character key process.

FIG. 17 illustrates a process of inputting TEL data.

FIG. 18 illustrates a process of inputting SCHD data.

FIG. 19 shows a display which indicates the data input error.

FIG. 23A shows examples of display in the transmitting apparatus.

FIG. 23B shows examples of display in the receiving apparatus.

FIG. 23C shows examples of display when a transmission error occurs.

DESCRIPTION OF THE PREFERRED EMBODIMENTS

Figure 1:
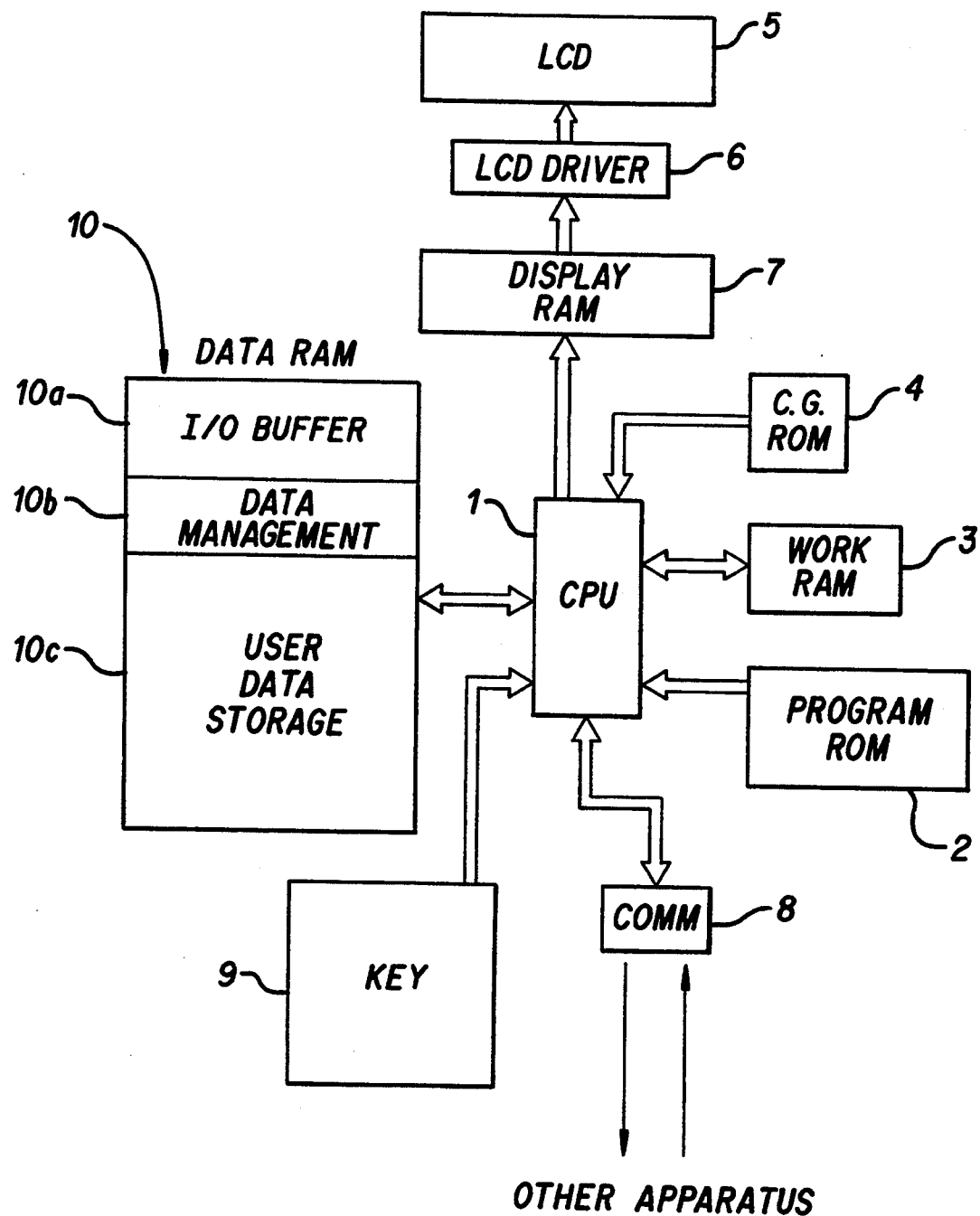
FIG. 1 is a block diagram of an electronic apparatus according to the invention.

FIG. 1 shows an electronic memo according to the invention. This electronic memo has numerous functions, but for the sake of simplicity the following description only deals with a schedule function, a telephone directory function, and a calculator function.

Figure 8:
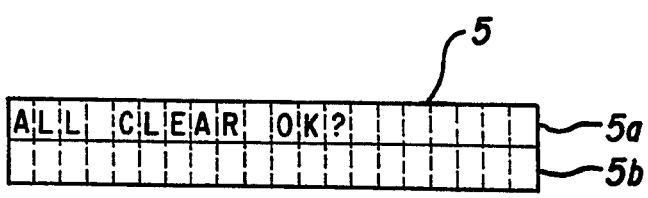
FIG. 8 shows a display in the reset process.

A CPU 1 controls the entire electronic device by executing the program stored in a program ROM 2. A work RAM 3 is a RAM used as the work area when the CPU 1 conducts the control process. A C.G. ROM 4 is a ROM in which character patterns for display are stored. A display section 5 is an LCD having two 20-character display units. As shown in FIG. 8, the upper unit 5a is a dot-matrix type display unit in which one character consists of $5 \times 7$ dots, and the lower unit 5b is a 7-segment display unit. An LCD driver 6 converts character patterns in the display RAM 7 into electric signals, and supplies them to the display section 5. Each bit in the display RAM 7 corresponds to one pixel in the display section 5. When the CPU 1 sets a display pattern in the display RAM 7, the display pattern is converted to drive signals for the LCD by the LCD driver 6, which are transmitted to the display section 5 to drive the LCD of the display section 5.

A communication unit 8 transmits and receives data to and from another electronic apparatus including an electronic memo of the same type as this embodiment. The communication unit 8 comprises a signal output terminal $S_o$ and a signal input terminal $S_i$.

A key section 9 has a number of keys, and it detects key input and relays the result and the type of keys operated to the CPU 1. The types of keys in the key section 9 will be described later. A data RAM 10 stores mainly data entered by the user, and comprises a user data storage section 10c where user data are stored, an input/output buffer 10a where data entered by the user and data retrieved from the user data storage section 10c are temporarily stored, and a data management section 10b which manages data stored in the user data storage section 10c.

Figure 2:
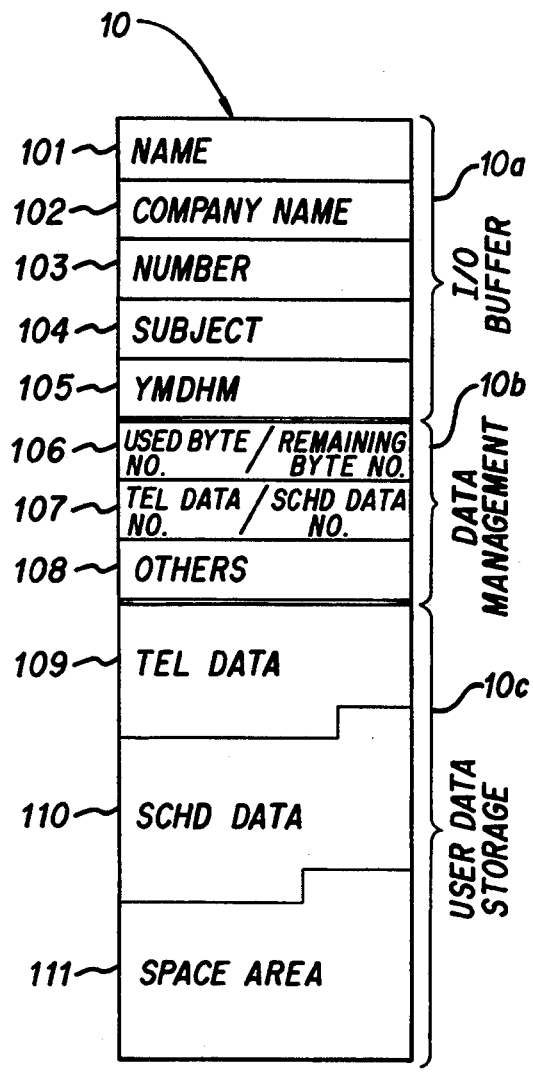
FIG. 2 is a diagram of the memory used in the apparatus.

FIG. 2 shows the data RAM 10 in detail. In this embodiment, the user can enter two types of data; i.e., telephone directory data (referred to as "TEL data") and schedule data (referred to as "SCHD data"). TEL data comprises three parts: name, company name, and number. SCHD data comprises six parts: subject, year, month, day, hour, and minute. The parts from year to minute are indicated by the numeral 105 in FIG. 2. The input/output buffer 10a temporarily stores the contents of each of these parts, and has a name field 101, a company name field 102, a number field 103, a subject field 104, and a year/month/day/hour/minute (YMDHM) field 105. A used byte number/remaining byte number area 106 in the data management section 10b stores the byte number of the areas already used by the user in the user data storage section 10c (i.e., total of byte number of a TEL data area 109 and that of a SCHD data area 110) and the byte number in a space area 111. A TEL data number/SCHD data number area 107 stores the number of data entered as TEL data or SCHD data. The numeral 108 indicates an area for other data necessary to manage the memory. The user data storage section 10c comprises the TEL data area 109 which stores data entered as TEL data, and the SCHD data area 110 which stores data entered as SCHD data. The space area 111 is an unused storage area. Since the length of TEL data and SCHD data is undefined, the number of bytes occupied by each set of data is not set. Therefore, the TEL data area 109 and SCHD data area 110 are dynamically allocated to allow them to increase or decrease in size as new data is entered or deleted. Data is stored forward in these areas with no space between them. TEL data is sorted in alphabetical order, and SCHD data in the order of the year, month, day, hour and minute in the user data storage section 10c.

Figure 3:
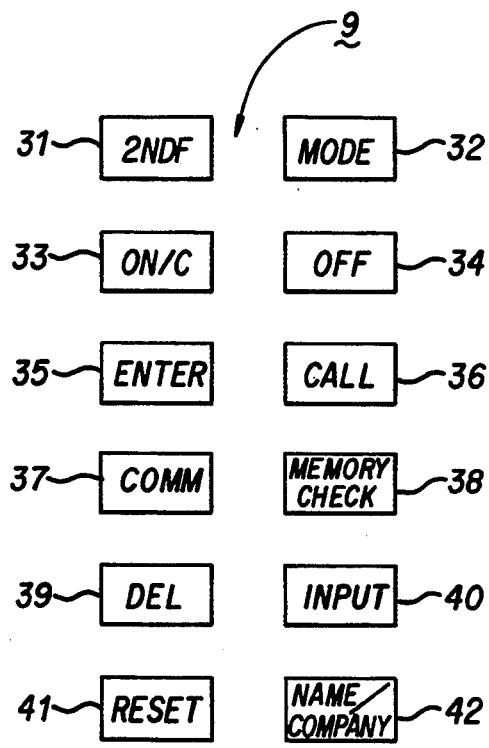
FIG. 3 is a diagram showing keys of the apparatus.

Some of the keys in the key section 9 are shown in FIG. 3. The function of these keys is briefly described below. A 2NDF key 31 is a so-called "second function" key which assigns a second function to the other keys by pressing it before operating the other keys as required. A MODE key 32 is used to select the TEL mode, SCHD mode or CAL mode for execution of the telephone directory function, schedule function or calculator function. An ON/C key 33 functions as a regular ON key when the power is off and as a CLEAR key which resets the display to its original condition when the power is already on. An OFF key 34 cuts off the power to the electronic memo. An ENTER key 35 is used to enter data the user has input in the user data storage section 10c. A CALL key 36 is used to call data entered in the user data storage section 10c and display it in the display section 5. A COMM key 37 is used to communicate with other apparatuses. The operation of the COMM key 37 will be described later. A MEMORY CHECK key 38 is used to display memory usage. A DELETE key 39 is used to delete input characters and data.

Input keys 40 are a group of keys used for inputting numerals (0-9), characters (A-Z) and symbols (+, −, etc.). A NAME/COMPANY key 42 is used to call data by a company name in the TEL mode. That is, this embodiment has a function to call in the TEL mode the most forward data matching the name and a function to call the most forward data matching the company name, the latter of which is performed using the NAME/COMPANY key 42. A RESET key 41 is used to force the entire system into a certain condition (temporarily referred to as "temporary reset condition"). Unlike the other keys, this RESET key 41 has a direct hardware connection to the CPU 1 so that it can operate the CPU 1 by means of an interrupt regardless of the condition of the CPU 1. That is, other keys cannot supply a signal to the CPU 1 other than when the CPU 1 requests input.

Figure 4:
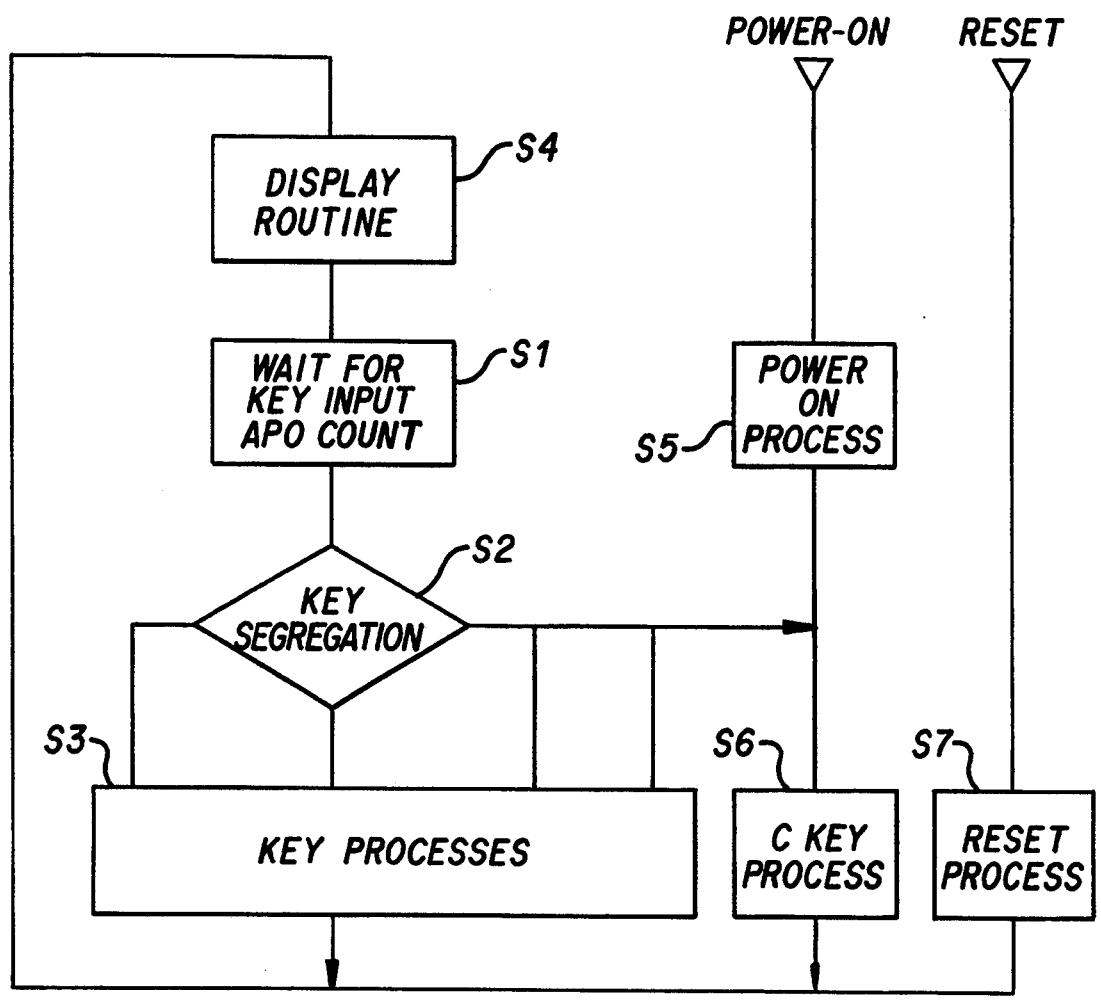
FIG. 4 is a flowchart of the key processes in the apparatus.

FIG. 4 is a flowchart illustrating the operation of the embodiment. First, when the user is not performing any operations on the system, in step S1 the system is in standby while performing the automatic power off (APO) count. If there is no input from any keys for more than a predetermined period, the power is automatically cut off to save the battery. The APO count is a time count for this purpose. When a key is pressed, a signal indicating key input and a code indicating the type of the pressed key are transmitted from the key section 9. The process progresses to the key segregation (step S2) where the process to be performed is selected according to the type of key pressed. Then, the process corresponding to the pressed key is performed in step S3. In each of the key process routines in step S3, the CPU 1 uses the work RAM 3, the communication unit 8 and the data RAM 10 to perform operations according to the contents of the program ROM 2, and then the process progresses to the display routine (step S4).

In the display routine, in order to perform a display at the positions designated by the process routine of each key, the character patterns of the characters to be displayed are obtained from the C.G. ROM 4, and the character patterns are set at the display positions in the display RAM 7. The character patterns set in the display RAM 7 are converted to electric signals got driving the LCD by the LCD driver 6, and display is performed in the display section 5.

Figure 5:
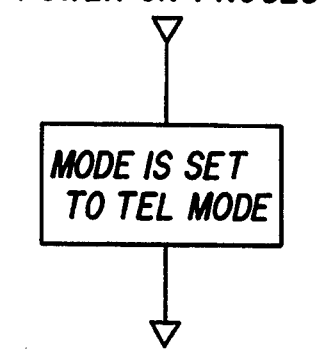
FIG. 5 is a flowchart of the power-on process in the apparatus.

Upon completion of the display process in step S4, flow returns to key standby in step S1 and waits for the next key input. When the ON/C key 33 is pressed while the power is off, flow is forced to start from step S5. Here, the TEL mode is selected as the main mode, and flow progresses to the C key process in step S6 (FIG. 5).

Figure 6:
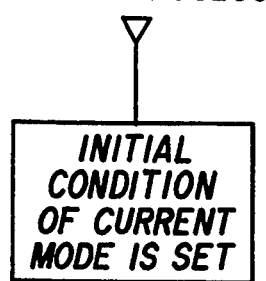
FIG. 6 is a flowchart of the C key process in the apparatus.
Figure 9:
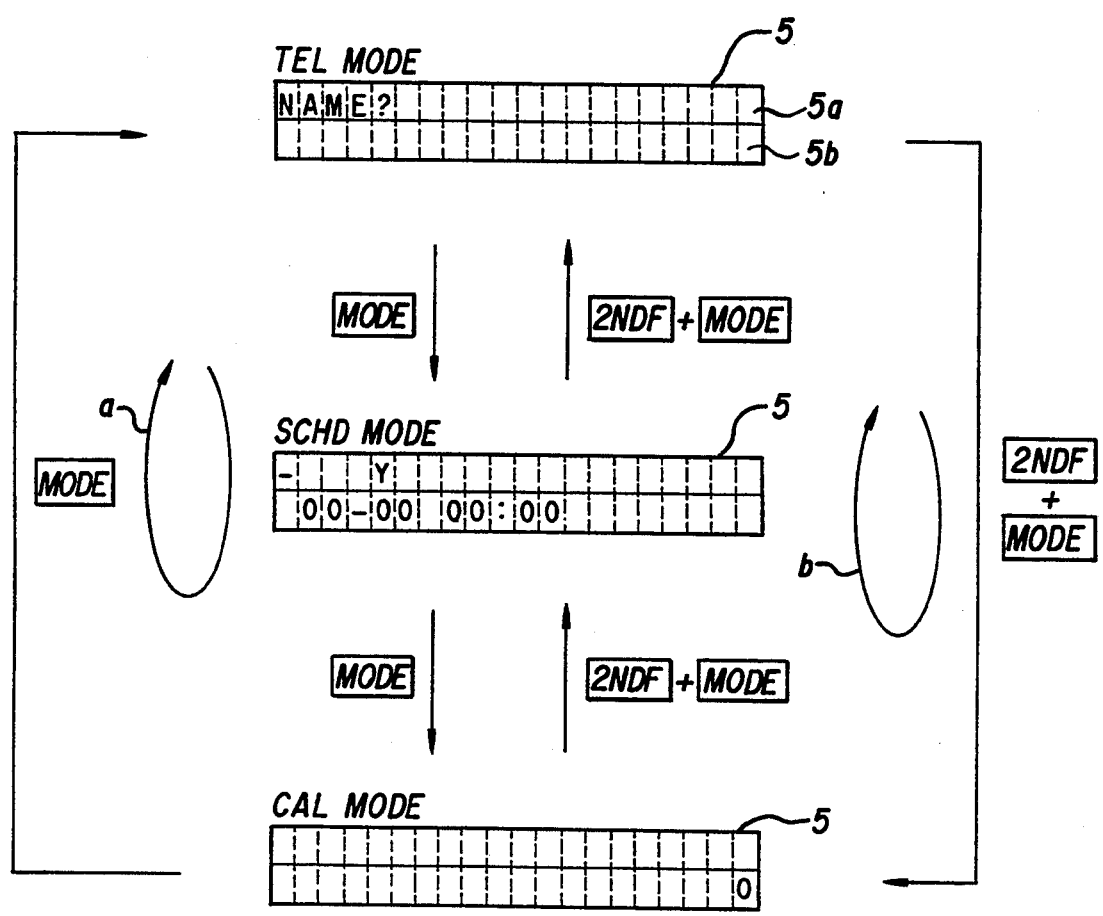
FIG. 9 illustrates the manner of changing the modes in the apparatus.

FIG. 6 shows the flow of the C key process. Here, the initial condition of the currently selected mode is set, after which the display routine corresponding to the selected mode is selected and control changes to that mode. The initial condition of each mode is shown in FIG. 9.

Figure 7:
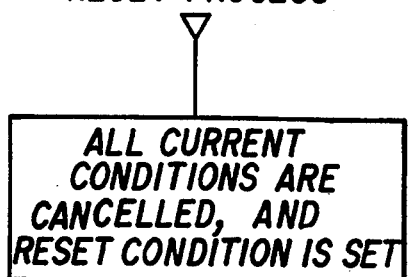
FIG. 7 is a flowchart of the reset process in the apparatus.

When the RESET key 41 is pressed, control moves to step S7 (FIG. 4) regardless of the kind of the current process. As shown in FIG. 7, all current conditions are discarded, and a reset condition is set. Then, the flow moves to the RESET display routine in step S4. The reset display is shown in FIG. 8. In the condition shown in FIG. 8, the user is requested to decide whether or not to erase all of the user data in the data management section 10b and user data storage section 10c of the data RAM 10 and initialize them. When the predetermined key (the ENTER key 35 in this embodiment) which represents YES is pressed, all of the user data is erased. When a key other than the predetermined key is pressed, the data is not erased and initialization is not performed, and flow moves to the C key process (step S6).

The process of each key will be described.

FIG. 10 shows the process of the OFF key 34. When the OFF key 34 is pressed, the display of the display section 5 is erased, and the power supply to the system is cut off. This causes the electronic memo to stop operation. However, the data RAM 10 operates on a separate power supply so the user data entered in the data RAM 10 is not lost. Further, after the power to the system is cut off, the program counter in the CPU 1 is set to the POWER-ON process address. By this means, when the ON/C key 33 is pressed, the control starts from the POWER-ON process.

FIG. 11 shows the process flow of the 2NDF key 31. When the 2NDF key 31 is pressed, the display of the FUNCTION symbol 13 at the left side of the display section 5 is toggled on and off.

Figure 14A:
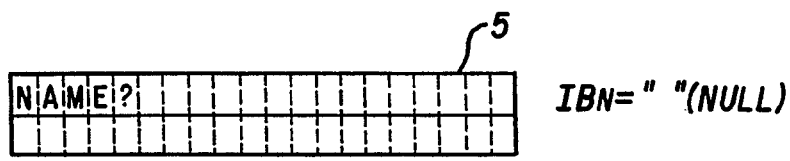
FIGS. 14A to 14C show the manner of inputting a name in a TEL mode of the apparatus.
Figure 14B:
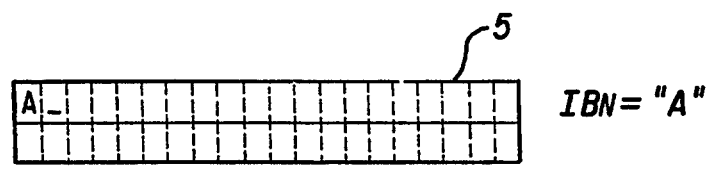
Figure 14C:
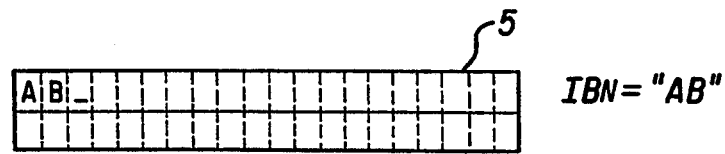

FIG. 12 shows an example of the process of the character input keys 40, and FIG. 14 an example of the character input using the input keys 40. In this embodiment, the input keys 40 comprises 17 keys so that approximately 100 kinds of characters including alphabet, numerals and symbols can be input. When any of the input keys 40 are pressed (step S21), an internal code corresponding to the pressed key is generated. A pointer indicating the current cursor position (position where the character is input) in the work RAM 3 is obtained, and the internal code is written into the position indicated by the pointer in the input/output buffer 10a. The pointer indicating the cursor position used here is initialized when the initial condition of the mode is set, and it increments each time a character is input. Next, in step S22, the process moves to the routine which develops the character code in the input/output buffer 10a into a character pattern using the C.G. ROM 4 and writes it into the display RAM 7 in the same manner as in the display routine (step S4). FIGS. 14A to 14C show an example of the character input from the initial condition of the TEL mode, where $IB_N$ on the right side of the figure indicates the character string being input to the name field in the input/output buffer 10a. FIG. 14A shows the initial display in which $IB_N$ contains nothing; i.e., NULL. When "A" is input using the input keys 40, the character "A" enters $IB_N$ and the display changes as shown in FIG. 14B. Here, the underline bar "—" to the right of the "A" in the display indicates the cursor position (i.e., the position where the next character will be entered). When the character "B" is then input, the character "B" is added to the IBN, and the display changes as shown in FIG. 14C.

Figure 13:
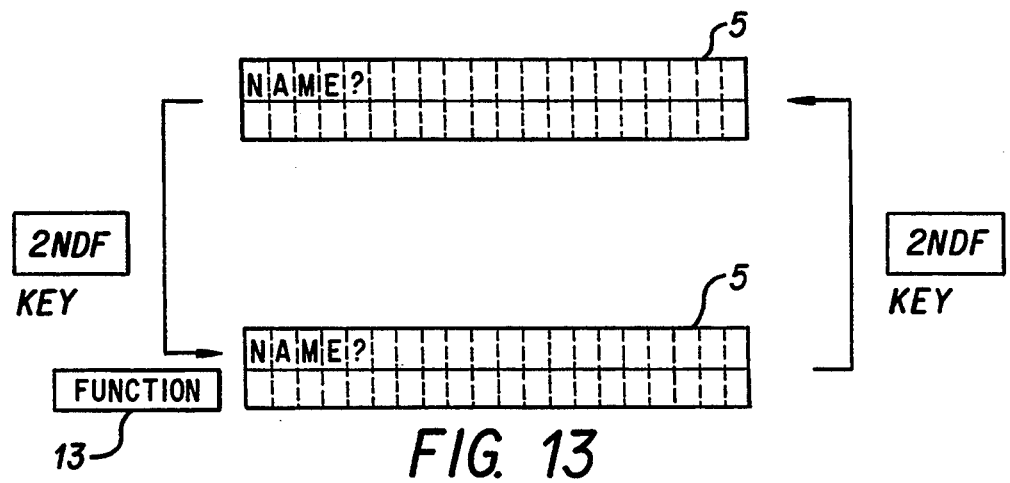
FIG. 13 is a diagram illustrating a FUNCTION symbol.
Figure 15:
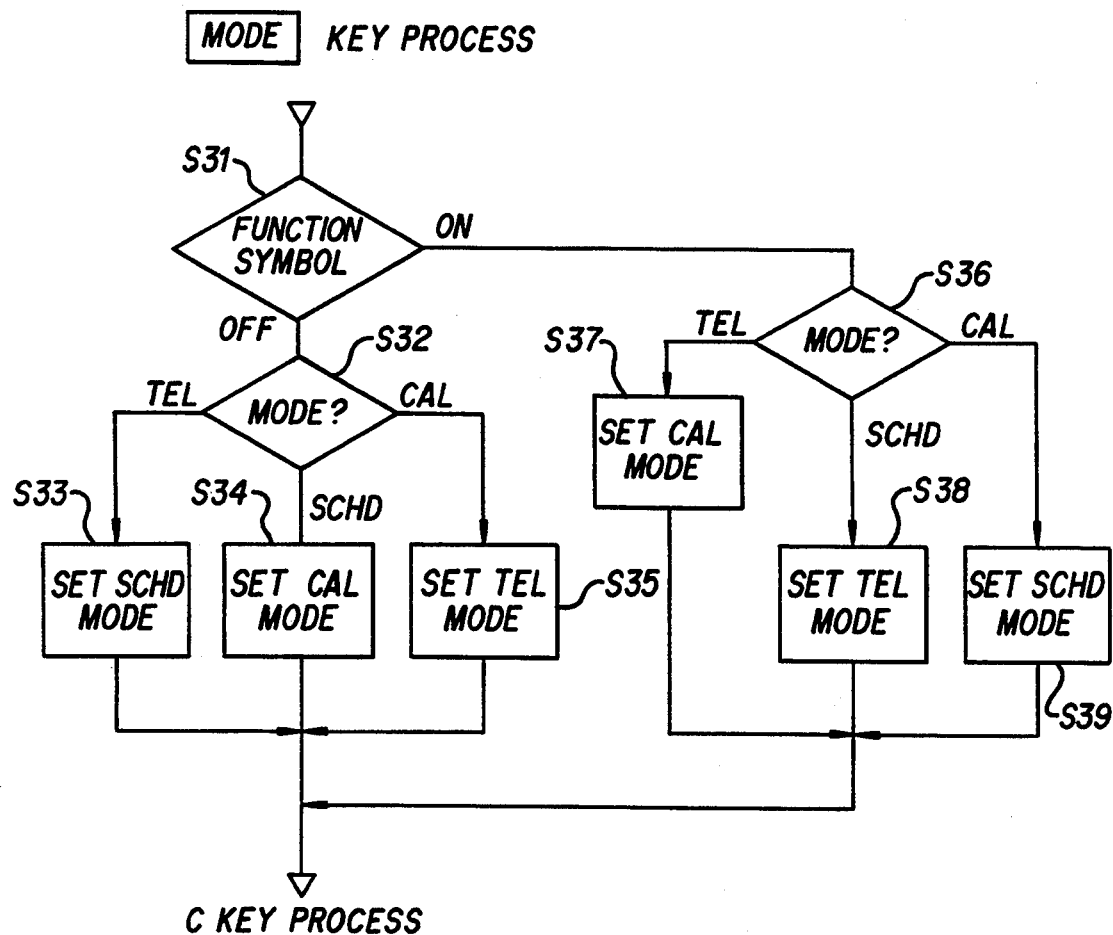
FIG. 15 is a flowchart of the MODE key process.

FIG. 15 shows the process performed when the MODE key 32 is pressed. When the MODE key 32 is pressed, first it is determined whether or not the FUNCTION symbol 13 (FIG. 13) is on or off (step S31). If the FUNCTION symbol 13 is off, the next function mode to be set will depend on the currently set function mode (step S32). That is, if the currently set function mode is the TEL mode, then the SCHD mode is set (step S33), if the currently set function mode is the SCHD mode, then the CAL mode is set (step S34), and if the currently set function mode is the CAL mode, then the TEL mode is set (step S35). Therefore, each time the MODE key 32 is pressed, the mode changes in sequence in a loop as indicated by the arrow A in FIG. 9; i.e., TEL mode→SCHD mode→CAL mode→TEL mode (this order is referred to as "the forward sequence").

When the FUNCTION symbol 13 is on (displayed), the process proceeds to step S36, and if the currently set function mode is the TEL mode, then the CAL mode is set (step S37), if the currently set function mode is the SCHD mode, then the TEL mode is set (step S38), and if the currently set function mode is the CAL mode, then the SCHD mode is set (step S39). Therefore, each time the MODE key 32 is pressed, the mode changes in sequence in a loop as indicated by the arrow B in FIG. 9; i.e., TEL mode→CAL mode→SCHD mode→TEL mode (this order is referred to as "the reverse sequence").

In this way, when the MODE key 32 is operated without pressing the 2NDF key 31, the mode changes sequentially in the forward direction A. When the MODE key 32 is operated after pressing the function key 31, in contrast, the mode changes sequentially in the reverse direction B. Therefore, when changing from the TEL mode to the CAL mode, the CAL mode can be directly set (i.e., without proceeding through the SCHD mode). In this case, the MODE key 32 is required only to be pressed once.

Figure 16:
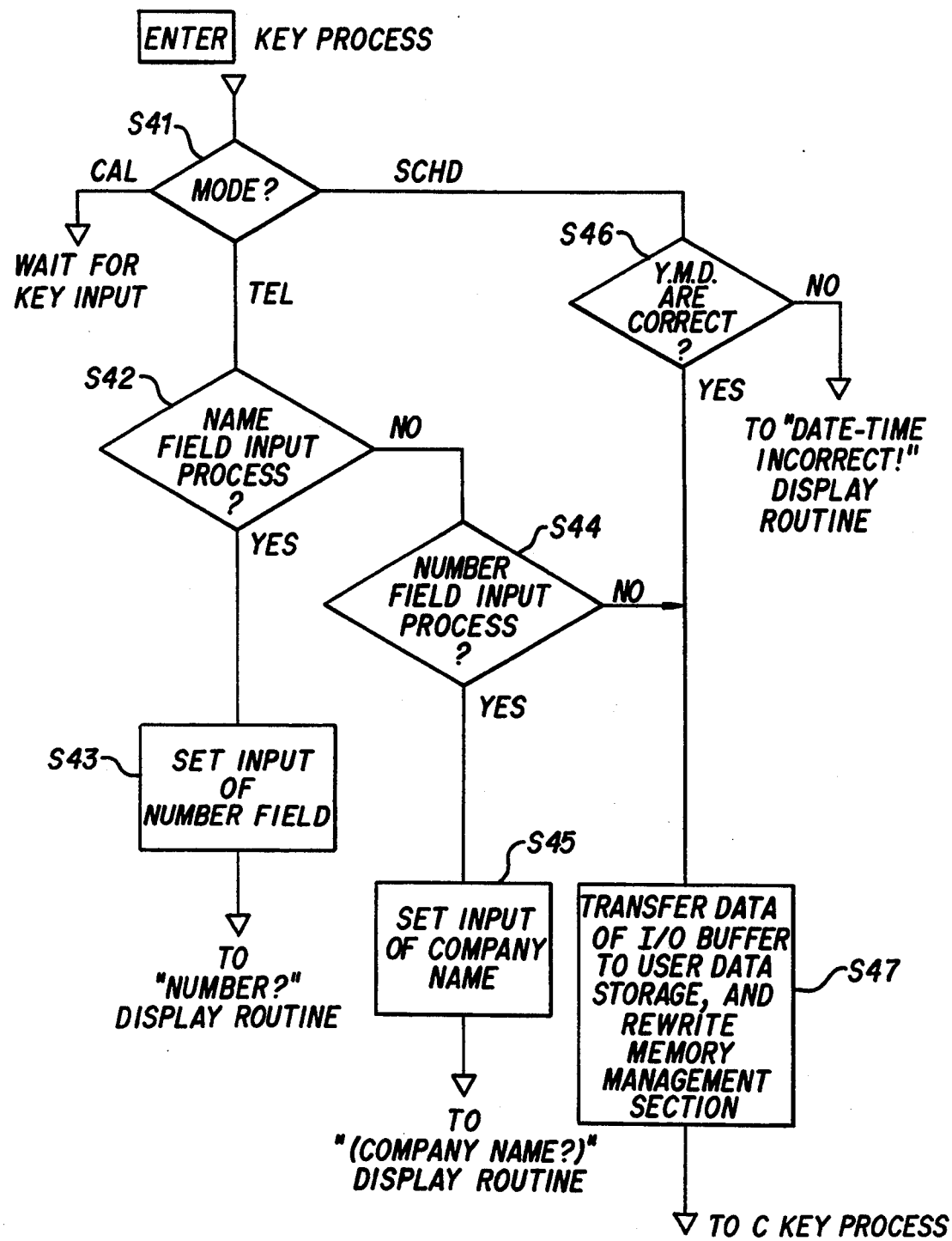
FIG. 16 is a flowchart of the ENTER key process.

The process of the ENTER key 35 is shown in FIG. 16. FIG. 17 shows an example of the procedure by which data is entered using the ENTER key 35 in the TEL mode. In FIG. 17, a character string or numeric string input by operating the ENTER key 35 or the input keys 40 is shown on the left side, and the right side shows the display contents of the display section 5 when this operation or input is performed.

First, for example, when the name "JONES" is input using the input keys 40 in the initial condition shown in (a) of FIG. 17, "JONES" is displayed in the dot-matrix part 5a of the display section 5 ((b) of FIG. 17). Pressing the ENTER key 35 causes the process to proceed to step S41. Since the name is being input, the process proceeds to step S43 where the number input mode is set. The Process then proceeds to the routine which displays "NUMBER?", and "NUMBER?" is displayed in the dot-matrix part 5a of the display section 5 ((c) of FIG. 17). The telephone number for example, "03-123-4567" is input using the input keys 40. The input telephone number is displayed in the segment part 5b of the display section 5 ((d) of FIG. 17).

When the ENTER key 35 is pressed again, the flow proceeds in the order S41→S42→S44→S45 to the routine which sets the company name input condition and displays "(COMPANY NAME?)". As shown in (e) of FIG. 17, "(COMPANY NAME?)" is displayed in the dot-matrix part 5a of the display section 5. The reason why parentheses are used here is to prevent confusion of the company name input condition with the name input condition. The condition in which "SHARP" has been input as the company name is shown in (f) of FIG. 17.

When the ENTER key 35 is pressed in this condition, the flow proceeds in the order S41→S42→S44→S47. The input data "JONES", "SHARP" and "03-123-4567" are temporarily stored in the name field 101, company name field 102 and number field 103, respectively, of the input/output buffer 10a by the character input key process routine shown in FIG. 12. In step S47, these data are transferred to the TEL data area 109 in the user data storage section 10c as TEL data. In this case, the TEL data in the TEL data area 109 is sorted so the names are in alphabetical order (i.e., A-Z—0-9—symbols). Furthermore, after the used byte number/remaining byte number and TEL data number are updated in the data management section 10b, the C key process and initialization are performed. The input-/output buffer 10a is cleared or null.

FIG. 18 shows the procedure by which SCHD data is entered. In FIG. 18, as in FIG. 17, the character or numeric string input by operating the ENTER key 35 or the input keys 40 is shown on the left side, and the display contents of the display section 5 when this operation or input is performed are shown on the right side. The year, month, day, hour, minute and subject are input from the initial condition shown in (a) of FIG. 18. All of these data are stored in the input/output buffer 10a, and each time a character, etc., is input, the cursor advances automatically. In FIG. 18, (b) shows the input of "1989" for the year, (c) the input of "10"–"12" for the month and day, and (d) the input of "12":"35" for the hour and minute. The year is displayed together with "Y" in The dot-matrix part 5a of the display section 5. The month, day, hour and minute are displayed in the 7-segment part 5b of the display section 5. As shown in (d) of FIG. 18, when the LSD of the minute is input, the year-minute data are temporarily stored in the area 105 of the input/output buffer 10a. The display of the year in the dot-matrix part 5a is cleared, and "SUBJECT?" is displayed in its place. When "PARTY" is input as the subject data, the character string "PARTY" is displayed in the dot-matrix part 5a ((d) of FIG. 18). This subject data is stored in the subject area 104.

When the ENTER key 35 is pressed, the processes in steps S41 and S46 are performed. In step S46, the year-minute data are checked for invalid data (e.g., 13 for the month, 40 for the day, 25 for the hour or 90 for the minute). If invalid data exists, the process proceeds to the "DATE-TIME INCORRECT!" display routine, and "DATE-TIME INCORRECT!" is displayed in the dot-matrix part 5a (FIG. 19). If the year-minute data is correct, the process proceeds to step S47, and the same storage processing as for the above-mentioned TEL data is performed. The SCHD data are sorted by the year, month, day, hour and minute in the SCHD data section 110.

Figure 20:
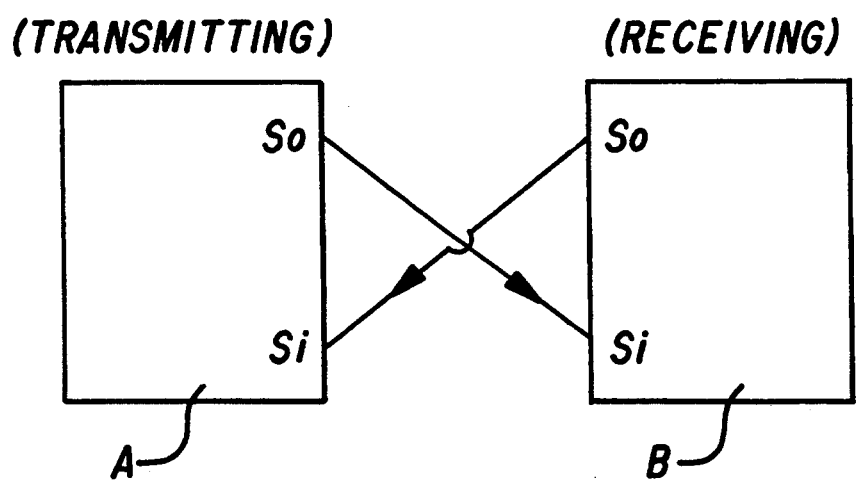
FIG. 20 is a diagram showing the manner of connecting two electronic memos with each other.

The process of the COMM key 37 will be described. When communicating the electronic memo (referenced by "A") with another electronic memo (referenced by "B") having the same configuration, the signal output terminal $S_o$ and signal input terminal $S_i$ of the electronic memo A are respectively connected to the signal input terminal $S_i$ and signal output terminal $S_o$ of the other electronic memo B, as shown in FIG. 20. The electronic memo on which the COMM key 37 is pressed first (e.g., the electronic memo B) becomes the receiving apparatus, and the electronic memo on which the COMM key 37 is pressed next (e.g., the electronic memo A) becomes the transmitting apparatus.

Figure 21A:
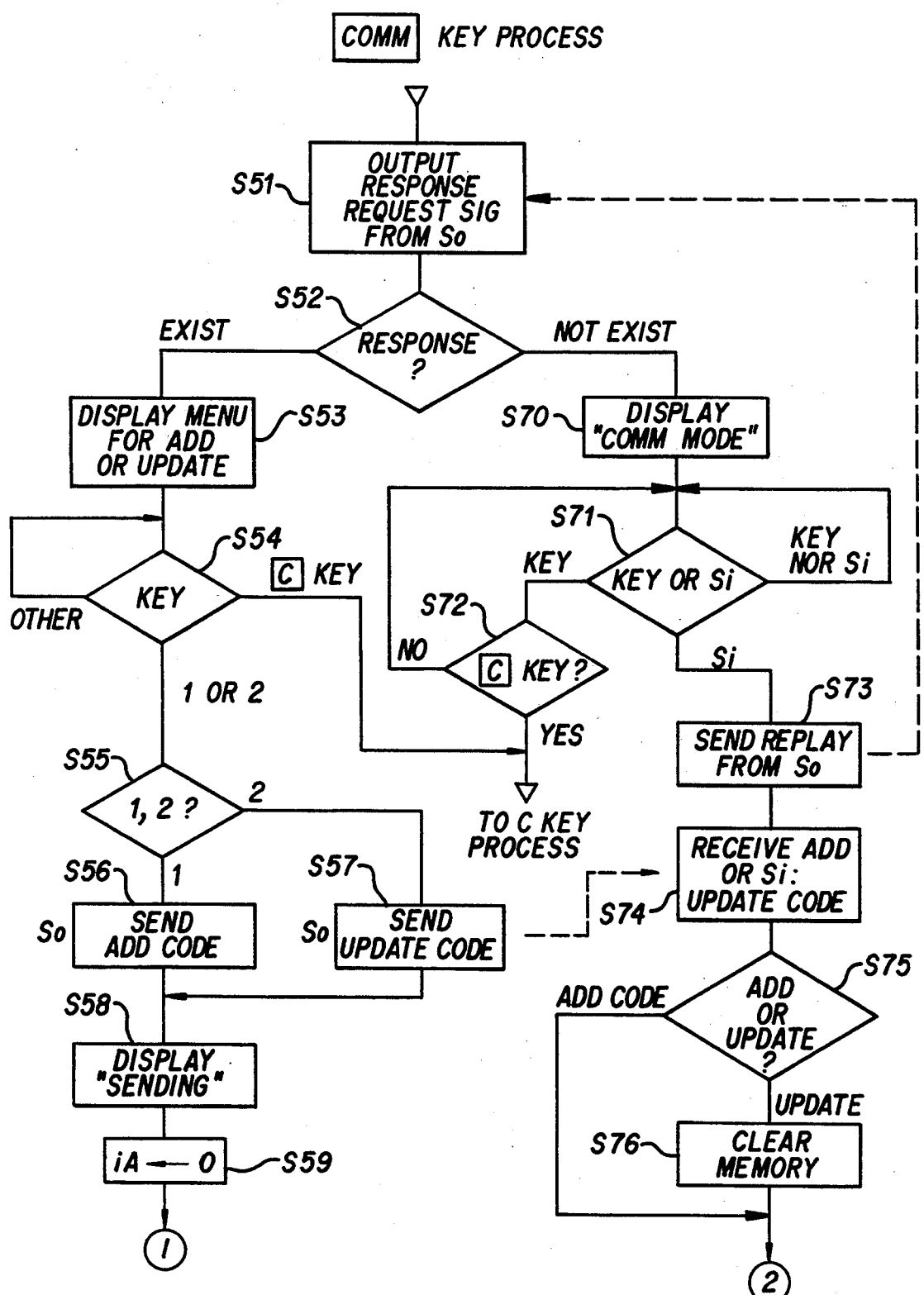
FIGS. 21A and 21B show a flow of transmitting data between two electronic memos.
Figure 21B:
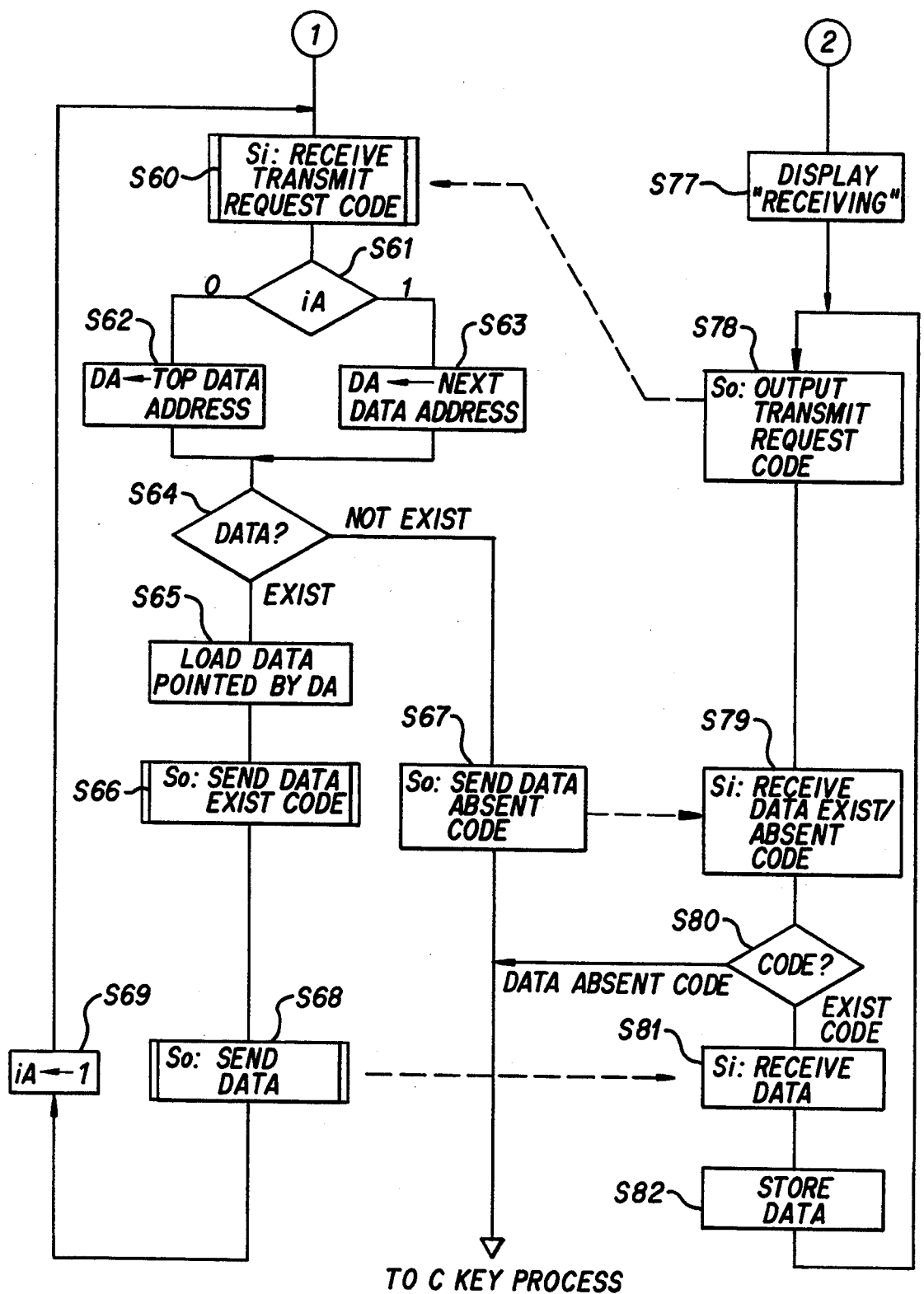

The process performed when the COMM key 37 is pressed will be described referring to FIGS. 21A and 21B. The broken lines FIGS. 21A and 21B indicate the flows of transmission between the two electronic memos. When the COMM key 37 of the electronic memo B is pressed, a response request signal is transmitted in step S51 from the signal output terminal $S_o$ of the electronic memo B to determine whether or not the electronic memo A is in the reception mode (whether the COMM key 37 of the memo A was pressed first). At this time, in the electronic memo A, the COMM key 37 has not been pressed yet, so the process is in step S1 (FIG. 4), and the APO count is performed while the memo A waits for key input. Therefore, even if a response request signal enters the signal input terminal $S_i$ of the memo A, it is ignored and a response signal is not transmitted from the memo A. Then, the process in the electronic memo B proceeds from step S52 to step S70, where "COMM MODE" is displayed in the display section 5 ((a) of FIG. 23B), and then in step S71, the memo B waits for CLEAR key input or signal input via the signal input terminal $S_i$. In this standby mode, no operation other than that of the CLEAR key is accepted, and when the C key 33 is pressed, the COMM mode is canceled, and the C key process shown in FIG. 6 is performed.

In the electronic memo A, when the COMM key 37 pressed in this standby mode, a response request signal is transmitted out from the signal output terminal $S_o$ in step S51 in the same way. This signal enters the signal input terminal $S_i$ of the electronic memo B, so the electronic memo B returns a response in reply to the response request from the electronic memo A (step S73), and the process proceeds to step S74. In the electronic memo A which receives the response from the electronic memo B, the process proceeds to step S53, and the display section 5 changes to the selection screen which asks whether data is to be transmitted in the add mode or in the update mode ((a) of FIG. 23A).

In the add mode, data transmitted from the transmitting apparatus (electronic memo A) is added to the data stored already in the receiving apparatus (electronic memo B). Therefore, when transmission is performed in the add mode, the data in the receiving apparatus are preserved and not erased. By contrast, in the update mode, all the data stored in the receiving apparatus before communication starts is cleared to be replaced with the data transmitted from the transmitting apparatus. Therefore, the data stored in the transmitting apparatus can be completely duplicated in the receiving apparatus. The add mode or the update mode is selected by pressing the "1" key or the "2" key, respectively, of the character input keys 40 (steps S54 and S55). When the C key 33 is pressed in step S54, the C key process described above is performed.

Below are descriptions of when the "1" key of the electronic memo A is pressed in step S54 and the add mode is selected (a), and when the "2" key is pressed and the update mode is selected (b).

(a) Add Mode

When the "1" key is pressed in step S54, an add code is transmitted as a command code to the electronic memo B (step S56), "SENDING" is displayed in the display section 5 (step S58, (b) of FIG. 23A), and the top data flag iA is set to "0". The top data flag iA is a flag which indicates whether or not even one data was transmitted and is "0" when the first data has not been transmitted yet and "1" when even one data has been transmitted.

The electronic memo B which receives the add code (step S74) proceeds to step S77 without clearing the contents of the data RAM 10 in step S76, and the display section 5 displays "RECEIVING" ((b) of FIG. 23B). Next, the electronic memo B transmits a transmit request code to the electronic memo A (step S78).

When the electronic memo A receives the transmit request code (step S60), the top data flag iA is discriminated (step S61). If the top data flag iA is "0", the address at the top of the data to be transmitted is given to the pointer DA which indicates the data address (step S62). If the top data flag iA is "1", the address of the data following the data just transmitted is given to the pointer DA (step S63).

Next, the electronic memo A checks if there is data at the address indicated by the pointer DA (step S64). If data does exist, the data indicated by the pointer DA is loaded from the user data storage section 10c to the input/output buffer 10a (step S65), and the code for "data exist" is transmitted from the signal output terminal S₀ to the electronic memo B (step S66). The electronic memo B receives the "data exist" code in step S81, and waits to receive the main body of data. The electronic memo A transmits the main body of data to the electronic memo B (step S68). The electronic memo B which receives the main body of data (step S81) temporarily stores it in the input/output buffer 10a, and then transfers the data from the input/output buffer 10a to the user data storage section 10c (step S82). In the electronic memo B, the process then returns to step S78, and requests the electronic memo A to transmit the next data.

The electronic memo A which has transmitted the main body of data sets the top data flag iA to "1" (step S69), and then returns to step S60 to wait for a transmit request code from the electronic memo B. When the transmit request code is received from the electronic memo B, the next data is transmitted as described above. When all of the data have been transmitted, "data absent" is discriminated in step S64, and the process proceeds to step S67. In step S67, the electronic memo A transmits a "data absent" code to the electronic memo B, and then performs the C key process. The electronic memo B which receives the "data absent" code (step S79) proceeds to the C key process from step S80. In this way, the communication process ends in both electronic memos A and B, and the display sections 5 return to their initial display.

(b) Update Mode

When the "2" key is pressed in step S54, The same process as in (a) above is performed except for the following process. An update code is transmitted as a command code to the electronic memo B (step S57). The electronic memo B which receives the update code (step S74) proceeds from step S74 to step S76, and clears the contents of the data RAM 10, after which "RECEIVING" is displayed on the display section 5 in step S77 ((b) of FIG. 23B).

Figure 22:
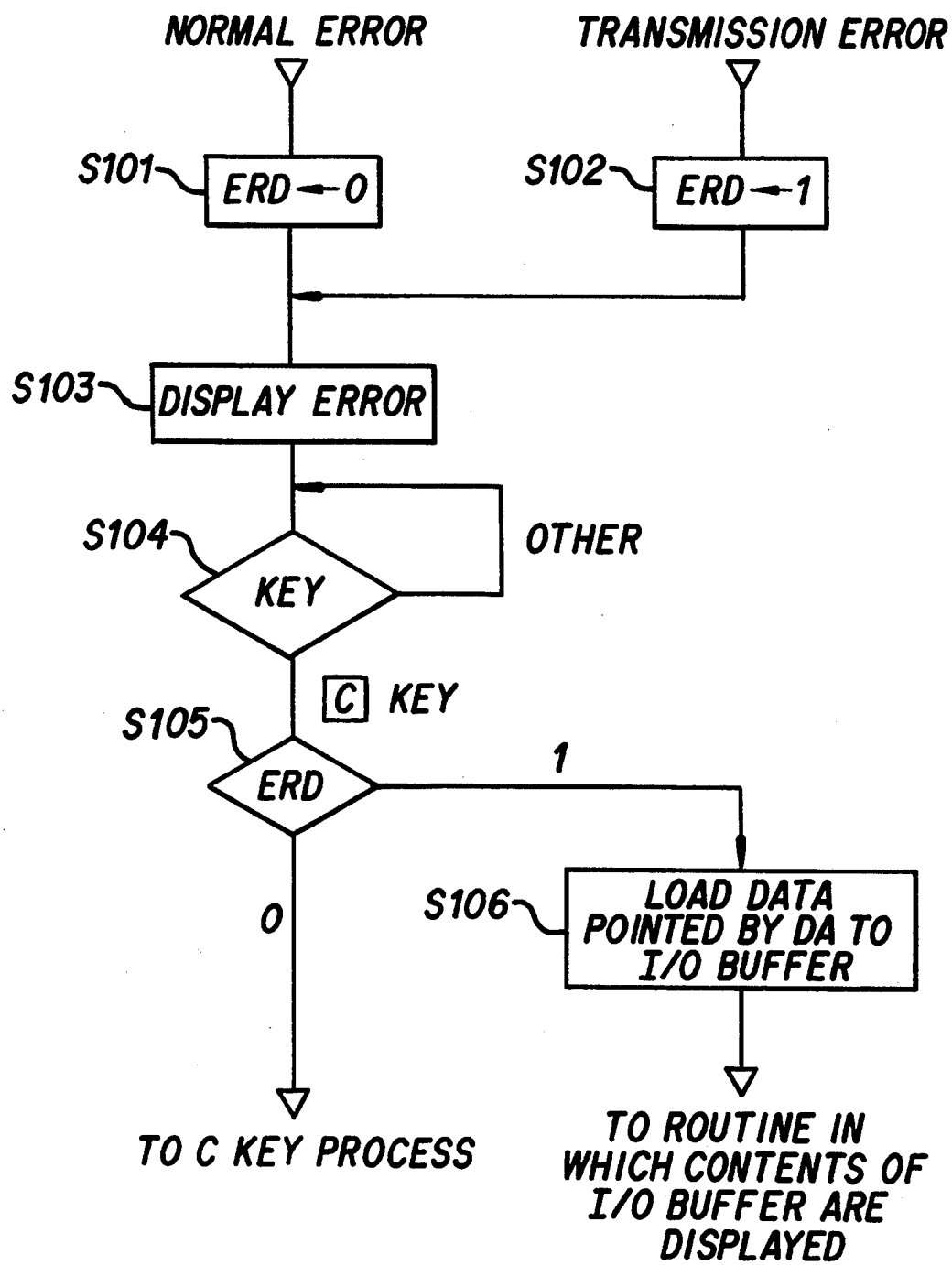
FIG. 22 is a flowchart showing the process performed when a transmission error occurs.

If the transmission or reception of codes or data is cut off for some reason (e.g., broken communication line, insufficient memory in electronic memo B) during the communication procedures described above, an error occurs. When this kind of error occurs, the error process shown in FIG. 22 is performed. When an error occurs in step S60, S66 or S68 in FIG. 21B (such an error is referred to as "data transmission error"), the process begins from step S102 in FIG. 22. When an error occurs elsewhere (referred to as "normal error"), the process begins from step S101.

In step S101, the error condition flag ERD is set to "0", and in step S102, the error condition flag ERD is set to "1". The error condition flag ERD indicates which of the two types of errors has occurred (i.e., "0": normal error, and "1": data transmission error). The process proceeds to step S103, and the display section 5 indicates that an error has occurred ((a) of FIG. 23C). Thereafter, both the memos A and B wait for the C key 33 to be pressed to cancel the error condition (step S104). When the C key 33 is pressed, the process proceeds to step S105 where the state of the error condition flag ERD is checked. When the error condition flag ERD is 0 (normal error), the process proceeds to the C key process shown in FIG. 6, and the display section 5 returns to its initial screen as that shown in (c) of FIG. 23C. When the error condition flag ERD is "1" (data transmission error), the process proceeds to step S107, the data under being transmitted (the address of which is indicated by the pointer DA) is loaded into the input/output buffer 10a, and the routine which displays the contents of the input/output buffer 10a is executed. An example of the display in this case is shown in (b) of FIG. 23C.

As described above, the electronic apparatus of this invention allows the user, when transmitting data, to select whether to transmit after erasing the data in the receiving electronic apparatus or preserve the data and add to it, and therefore the user can perform data transmission as required by the application.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An electronic apparatus comprising a memory means for storing data and a communication means for transmitting at least one portion of said data stored in said memory means to another electronic apparatus, said apparatus further comprising:

a selection means for, before transmitting at least one portion of said data, selecting either of an add mode and an update mode as a function of a user input, a signal means for, when said add mode is selected, generating a first signal which is transmitted by said communication means to said other electronic apparatus, said first signal being indicative that said add mode is selected, and for, when said update mode is selected, generating a second signal which is transmitted by said communication means to said other electronic apparatus, said second signal being indicative that said update mode is selected, and said first signal generated by said signal means placing said other apparatus in said add mode wherein said transmitted portion of data is added to data stored in said other electronic apparatus, and said second signal generated by said signal means placing said other apparatus in said update mode wherein data stored in said other electronic apparatus is replaced with said transmitted portion of data.

2. An apparatus according to claim 1, said communication means further comprising means for receiving data from said other electronic apparatus.

3. An apparatus according to claim 2, wherein said apparatus further comprises a memory management means for, when said communication means receives said first signal from said other electronic apparatus, add data transmitted from said other electronic apparatus to data stored in said memory means, and for, when said communication means receives said second signal from said other electronic apparatus, replacing data stored in said memory means being replaced with data transmitted from said other electronic apparatus.

4. An apparatus according to claim 1, wherein said apparatus is an electronic organizer for storing in said memory means data representative of at least one of telephone number information and schedule information.

5. An electronic apparatus comprising:
- memory means wherein data is stored;
- communication means for transmitting at least one portion of data stored in the memory means to a second electronic apparatus during a transmit operation and for receiving data from the second electronic apparatus during a receive operation;
- a selection means for, before transmitting the at least one portion of the data in the transmit operation, selecting one of an add mode and an update mode as a function of a user input;
- control means responsive to a selection means of the second electronic apparatus for controlling the storage of information in the memory means during the receive operation in accordance with a mode selection of the second electronic apparatus, whereby during the receive operation in an update mode the control means loads the transmitted data obtained through the communication means from the second electronic apparatus into a location in the memory means for replacing data previously stored in the memory means, and whereby during the receive operation in an add mode the control means loads the transmitted data obtained through the communication means from the second electronic apparatus into a location in the memory means for supplementing data stored in the memory means.

* * * * *